Aug. 16, 1960   J. J. SIGMAN, JR   2,948,952
LOCATING SMALL PINIONS ON ARBORS
Filed June 17, 1957
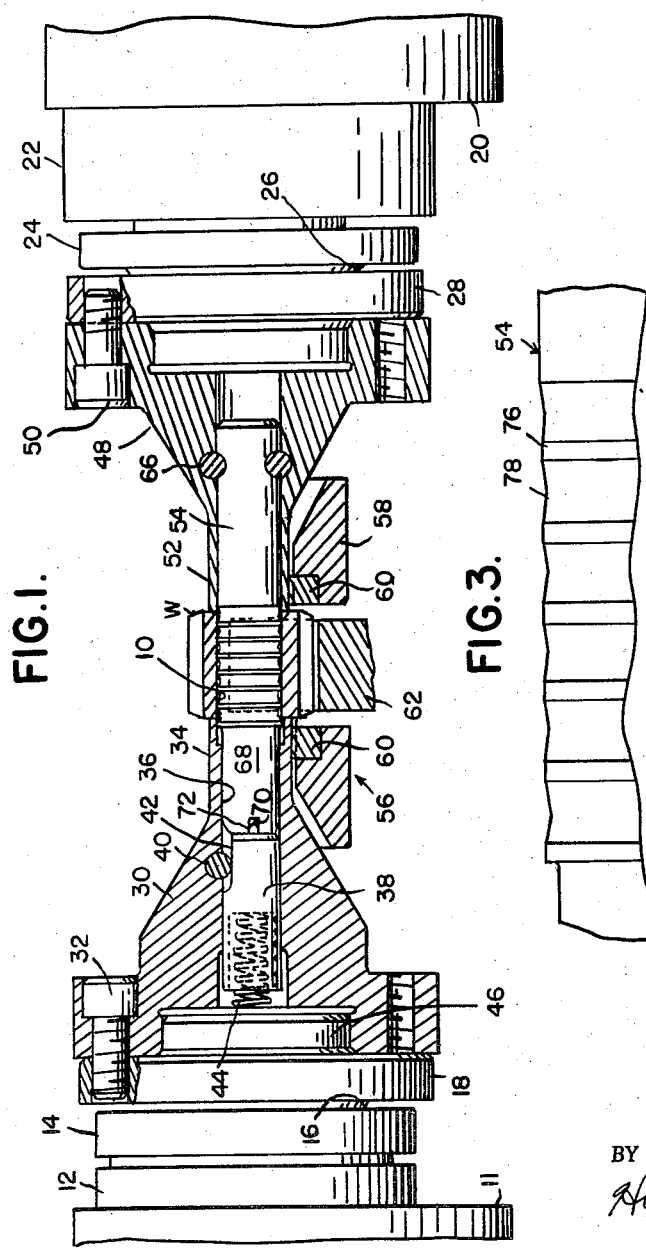
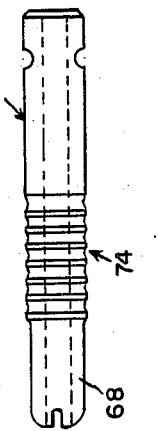
INVENTOR.
JOHN J. SIGMAN JR.
BY Whittemore,
Hulbert & Belknap
ATTORNEYS United States Patent Office 2,948,952
Patented Aug. 16, 1960

2,948,952
LOCATING SMALL PINIONS ON ARBORS

John J. Sigman, Jr., Detroit, Mich., assignor to National Broach & Machine Company, Detroit, Mich., a corporation of Michigan Filed June 17, 1957, Ser. No. 665,981

8 Claims. (Cl. 29—90)

The present invention relates to locating small pinions on arbors.

It is an object of the present invention to provide work support means for small work pieces having cylindrical holes or openings of variable internal diameters comprising an arbor insertable through the hole and including annular burnishing portions dimensioned to burnish the hole in the work piece to the required final internal diameter.

It is a further object of the present invention to provide an arbor with a plurality of axially spaced annular burnishing portions adapted to be moved into a hole of a work piece so that at least the leading annular burnishing portion passes through the work piece and a plurality of annular burnishing portions remain in the opening to afford adequate support for the work piece.

It is a further object of the present invention to provide work supporting mechanism for relatively small pinions including means for insuring rotation of the supporting head and tailstocks without injury to the work piece.

Other objects and features of the invention will become apparent as the description proceeds, especially when taken in conjunction with the accompanying drawing, illustrating a preferred embodiment of the invention, wherein:

Figure 1 is a fragmentary elevational view partly in section showing a work piece supported on an arbor constructed in accordance with the present invention.

Fighre 2 is an elevational view of the arbor alone.

Figure 3 is an enlarged fragmentary elevational view of the arbor.

Referring now to the drawing there is illustrated mechanism for supporting a work piece W, which may be in the form of a small pinion having a cylindrical opening 10 extending therethrough. The work supporting mechanism comprises a headstock 11 having a quill 12, a bearing seal 14, and a spindle 16 having a radially extending flange 18 at one end. Associated with the headstock 11 is a tailstock 20 having a sliding quill 22, a bearing seal 24, and a spindle 26 having a radially extending flange 28.

The work piece is indicated at W and is intended to be supported in a plug and cup type support. The cup is indicated at 30 and is secured to the flange 18 by suitable means such as the bolt 32. The inner end of the cup is reduced to provide a relatively thin walled sleeve 34 having an opening 36 therein. Within the opening 36 a sliding plunger 38 is provided, its movement being limited by a pin 40 working with a flattened side portion 42 thereof. A compression spring 44 is provided which is received within a recess at the inner end of the plunger 38 and bears against a reduced extension 46 of the spindle.

The plug portion of the assembly comprises a plug holder 48 generally similar in shape to the cup 30 which is bolted or otherwise secured as indicated at 50 to the flange 28. The inner end of the plug holder 48 is reduced to provide a thin walled tubular portion 52. Fixedly retained within the plug holder 48 is the plug or arbor 54.

The head and tailstock and associated mechanism is illustrated in conjunction with automatic loading mechanism a portion of which is indicated generally at 56. The automatic loading mechanism includes abutment members 58 each of which is provided with a generally U-shaped stripper 60 of hardened material. Also associated with the automatic loading mechanism is the jaw 62 which is adapted to move a series of work pieces W serially into position and in some cases, if desired, to remove them after the machining operation.

In operation the plug construction including the arbor 54 is moved from a retracted position to the right to the operating position shown in Figure 1. At this time the arbor passes through the opening 10 in the work piece.

In some cases the cup 30 may also be movable and operates to shift the work piece W away from the face of the left hand stripper 60.

After the machining operation has been completed, the plug assembly including the arbor 54 is retracted to the right. The work piece is stripped off of the arbor by engagement with the stripper 60 and when the arbor is completely withdrawn it may drop to a discharge chute (the jaw 62 having moved out of position), or in some cases the jaw 62 may be in a position to receive the finished work piece and move it out of the machining zone.

Although in some cases the work piece W may be driven in rotation, the usual operation is one in which the work piece W is engaged by a gear-like work piece and is driven in rotation thereby. It is accordingly essential to have the engagement between the work piece W and the supporting mechanism such that rotation is imparted to both spindles 16 and 26. The work piece is normally firmly held on the spindle or arbor 54 which is non-rotatably carried by the plug holder 48, as indicated at 66. Accordingly, rotation of the work piece W imparts rotation to the spindle 26 without difficulty. However, in order to impart rotation to the headstock spindle 16 additional means are desirable.

The free end of the spindle 54 includes a reduced portion 68 which is provided with a transverse slot 70. The end of the slidable plunger 38 includes a tang 72 movable into the slot 70 so that rotation is imparted to the plunger 38 and, by virtue of the pin 40, rotation is also imparted to the cup 30 and spindle 16.

Thus, the rotation is ordinarily transmitted directly from the work piece to the arbor 54 and thence to the spindle 16 through the engagement between the tang 72 and slot 70. In the absence of this construction pressure sufficient to insure rotation of the cup 30 may spread the end of the work piece W. The wall section of the work piece W is necessarily relatively thin, as illustrated in the figure.

Referring now to Figures 2 and 3, it will be observed that the arbor 54 has an outboard reduced end portion 68 and an intermediate portion 74 provided with a series of annular burnishing lands. The burnishing lands serve a dual function. In the first place, they operate to burnish the interior diameter of the opening 10 in the work piece to a final desired dimension. In the second place, they serve as means for affording firm adequate support for the work piece W during machining operations which are to be performed thereon, such for example as a gear finishing operation.

Difficulty has been encountered in the past because small pinions of the character described are mass produced and considerable variation in internal diameter of the hole 10 is found. A supporting arbor without the burnishing rings may bind upon the surface of holes which are at the underside of the tolerance. The pinions or other work pieces if at the upper end of the necessarily allowable tolerance may actually be loose on and inadequately supported by the arbor.

In accordance with the present invention the allowable tolerance for internal diameters of the holes 10 through the work pieces is selected such that its upper limit is at the desired final dimension. Thus, if the final internal diameter of the hole 10 through the work piece is to be .5040 inch, the allowable tolerance for the internal diameter may be $$\frac{.5040}{.5035} \text{ inch}$$

In this case the reduced end portion 68 of the arbor may have an outside diameter of $$\frac{.4999}{.4997} \text{ inch}$$

although this dimension is not particularly critical. The remainder of the arbor, and particularly the portion thereof which supports the work piece in the machining operation will have an outside diameter of $$\frac{.5040}{.5039} \text{ inch}$$

As best seen in Figure 3, the lands 76 are separated by shallow relieved grooves 78. In an actual arbor which has operated very satisfactorily in production, the lands 76 were formed with a width or axial dimension of approximately 1/32 of an inch and were spaced apart approximately 3/32 of an inch. The depth of relief between adjacent lands is unimportant and may vary from .001 to .010 inch.

Employing an arbor of the type just described it will be observed that the minimum size of arbor, whose dimension may of course be carefully controlled, is .5039 inch. The arbors are hardened and ground so that the land surfaces 76 constitute burnishing surfaces. In the event that a random work piece is selected whose internal diameter lies between .5035 and .5039 inch, passage of the land portion of the arbor therethrough will burnish the hole 10 of the work piece to a dimension of .5039 inch which is within .0001 inch of the final desired diameter. In addition, since the hole 10 is burnished to the exact outside diameter of the lands 76, it will be observed that the work piece is firmly and adequately supported on the arbor for subsequent machining operations. If the arbor were not provided with the burnishing lands separated by the intermediate relieved grooves, the work piece would bind upon the arbor and would be extremely difficult to remove. When however, the outside diameter of the work supporting portion of the arbor is formed with axially spaced burnishing ribs or lands, the inside diameter of the work piece is burnished to the required dimension and the work piece, while adequately supported on the arbor, may nevertheless be removed therefrom without difficulty following the machining operation.

If the outside diameter of the land portions of the arbor is .5039 inch and if a random gear or work piece is selected whose hole has an internal diameter at the upper limit of tolerance; namely, .5040 inch, it will of course be apparent that no burnishing will take place. On the other hand, since there is only .0001 inch difference in diameters, it will be apparent that the work piece will be adequately supported on the arbor. Also, in this case the work piece does not require enlargement of its internal diameter since this happens by chance to be exactly the desired final diameter.

It is of course appreciated that only in exceptionally rare cases will the foregoing situation result. If desired, the limits on outside diameter of the burnishing rings of the spindle could of course be $$\frac{.5040}{.5041} \text{ inch}$$

in which case the work piece W will in every case without exception be supported with the equivalent of a press fit on the arbor while at the same time it will be easily removable therefrom.

It will be apparent from the foregoing that small work pieces may be machined in mass production as before, the only requirement being that the tolerance range shall be selected at and below (and in no case above) the final desired dimension. The outside diameter of the burnishing lands of the arbor are carefully ground to be at or just slightly below (by as little as .0001 inch) of the final desired internal diameter of the hole in the work piece. With this arrangement the work pieces are engaged by the arbor and two functions are performed. If the random slected work piece has an internal diameter less than final desired diameter by a specified minimum tolerance (as for example .0001 inch), the arbor in all cases will enlarge the hole in the work piece by a burnishing operation to the final desired internal diameter or within .0001 inch thereof. At the same time, the work piece will necessarily be adequately supported on the arbor since in substantially all cases it will be in firm pressure contact therewith and in the exceptional case of an arbor of minimum allowable diameter and a work piece having an opening of maximum allowable diameter, the variation which will still be only .00005 inch at each side, which represents an accurate supporting condition. In all cases the foregoing is accomplished in a manner which permits removal of the work piece from the arbor without difficulty.

While for convenience the lands are preferably annular, it is recognized that equivalent results could be accomplished if the lands were arranged in a continuous helix so long as the axial width and separation between adjacent convolutions remain approximately the same.

The drawing and the foregoing specification constitute a description of the improved locating of small pinions on arbors in such full, clear, concise and exact terms as to enable any person skilled in the art to practice the invention, the scope of which is indicated by the appended claims.

What I claim as my invention is:

1. Work support structure comprising head and tail stocks, aligned spindles in said stocks mounted therein for rotation and for relative movement toward and away from each other, an arbor fixed to one of said spindles, said arbor being designed for use with work pieces having holes whose internal diameters have a predetermined manufacturing tolerance below the required finished diameter, said arbor having thereon a plurality of narrow annular lands separated by shallow annular relief channels, said lands being of an external diameter accurately held to the desired finished hole diameter of the work piece, said arbor being hardened to burnish the hole in the work piece to the desired finished diameter.

2. Work support structure comprising head and tail stocks, aligned spindles in said stocks mounted therein for rotation and for relative movement toward and away from each other, an arbor fixed to one of said spindles, said arbor being designed for use with work pieces having holes whose internal diameters have a predetermined manufacturing tolerance below the required finished diameter, said arbor having thereon a plurality of narrow annular lands separated by shallow annular relief channels, said lands being of an external diameter accurately held to the desired finished hole diameter of the work piece, said arbor being hardened to burnish the hole in the work piece to the desired finished diameter, said lands having cylindrical crests having a width of approximately 1/32 of an inch.

3. Work support structure comprising head and tail stocks, aligned spindles in said stocks mounted therein for rotation and for relative movement toward and away from each other, an arbor fixed to one of said spindles, said arbor being designed for use with work pieces having holes whose internal diameters have a predetermined manufacturing tolerance below the required finished diameter, said arbor having thereon a plurality of narrow annular lands separated by shallow annular relief channels, said lands being of an external diameter accurately held to the desired finished hole diameter of the work piece, said arbor being hardened to burnish the hole in the work piece to the desired finished diameter, said lands having cylindrical crests having a width of approximately 1/32 of an inch and being spaced apart a distance at least twice the width of the cylindrical crests of said lands.

4. Work support structure comprising head and tail stocks, aligned spindles in said stocks mounted therein for rotation and for relative movement toward and away from each other, an arbor fixed to one of said spindles, said arbor being designed for use with work pieces having holes whose internal diameters have a predetermined manufacturing tolerance below the required finished diameter, said arbor having thereon a plurality of narrow annular lands separated by shallow annular relief channels, said lands being of an external diameter accurately held to the desired finished hole diameter of the work piece, said arbor being hardened to burnish the hole in the work piece to the desired finished diameter, said lands having cylindrical crests spaced apart a distance sufficient to provide for support of a work piece on a plurality of lands.

5. Work support structure comprising head and tail stocks, aligned spindles in said stocks mounted therein for rotation and for relative movement toward and away from each other, an arbor fixed to one of said spindles, said arbor being designed for use with work pieces having holes whose internal diameters have a predetermined manufacturing tolerance below the required finished diameter, said arbor having thereon a plurality of narrow annular lands separated by shallow annular relief channels, said lands being of an external diameter accurately held to the desired finished hole diameter of the work piece, said arbor being hardened to burnish the hole in the work piece to the desired finished diameter, a cup member fixed to the other of said spindles, said cup member having a yieldably slidable plunger therein, said arbor having an extension receivable in said cup and engageable with said plunger, the adjacent ends of said extension and plunger having interfitting portions shaped to transmit rotation from said arbor to said plunger, and means connecting said slidable plunger to said cup to transmit rotation thereto.

6. Work support structure comprising head and tail stocks, aligned spindles in said stocks mounted therein for rotation and for relative movement toward and away from each other, an arbor fixed to one of said spindles, said arbor being designed for use with work pieces having holes whose internal diameters have a predetermined manufacturing tolerance below the required finished diameter, said arbor having thereon a plurality of narrow annular lands separated by shallow annular relief channels, said lands being of an external diameter accurately held to the desired finished hole diameter of the work piece, said arbor being hardened to burnish the hole in the work piece to the desired finished diameter, an annular shoulder surrounding said arbor and engageable with one side of a work piece, a cup member fixed to the other of said spindles and including an annular shoulder engageable with the other side of a work piece, said cup member having a yieldably slidable plunger therein, said arbor having an extension receivable in said cup and engageable with said plunger, the adjacent ends of said arbor extension and plunger having interfitting portions shaped to transmit rotation from said arbor to said plunger, and means connecting said slidable plunger to said cup to transmit rotation thereto.

7. Rotary work support structure comprising a rotatable plug holder, an elongated plug carried by said holder having an intermediate burnishing arbor portion, said plug holder having an annular work engaging shoulder surrounding one end of the arbor portion of said plug, a rotatable cup having a recess therein shaped to receive an end portion of said plug located outwardly beyond the arbor portion thereof, said cup having an annular shoulder at one end thereof in alignment with the annular shoulder on said plug holder, said plug holder and cup being movable toward and away from each other, the arbor portion of said plug having a plurality of annular burnishing lands thereon to burnish holes in work pieces to final required dimensions and to remain in tight supporting relation in the burnished holes in said work pieces during subsequent rotation of said work pieces.

8. Rotary work support structure as defined in claim 7 comprising a plunger slidably and non-rotatably received in said cup, said plunger and the end of said plug having interfitting means effective to transmit rotation between said plug and said cup.

References Cited in the file of this patent

UNITED STATES PATENTS

| | | |
|---|---|---|
| 2,255,140 | Waring | Sept. 9, 1941 |
| 2,382,608 | Connell | Aug. 14, 1945 |
| 2,576,497 | Austin et al. | Nov. 27, 1951 |
| 2,665,136 | Fallon | Jan. 5, 1954 |
| 2,762,629 | Dalby | Sept. 11, 1956 |
| 2,791,024 | Vavrinek | May 7, 1957 |